Figure 1:
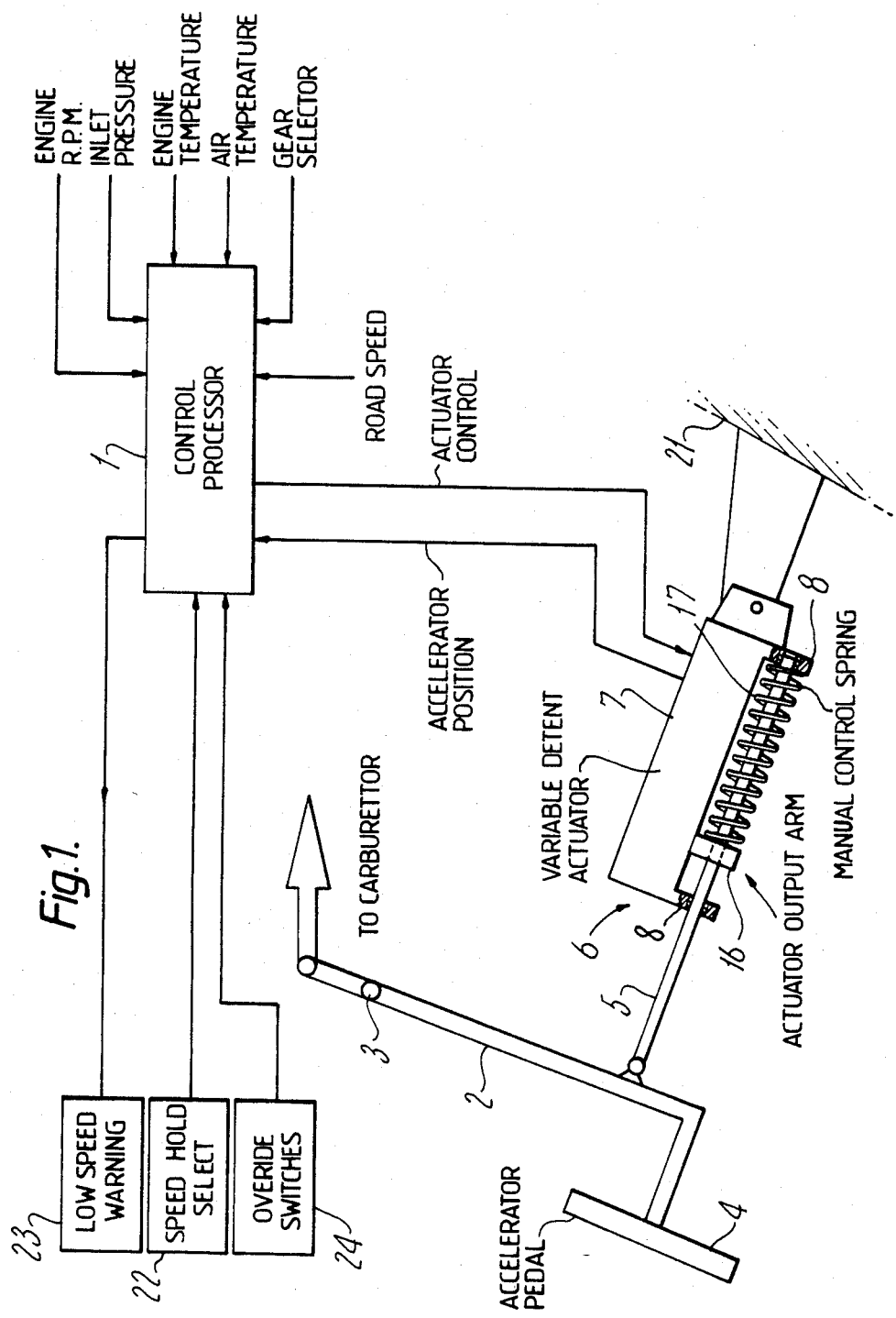

United States Patent [19]
Acklam et al.

[11] Patent Number: 4,513,235
[45] Date of Patent: Apr. 23, 1985

[54] CONTROL APPARATUS

[75] Inventors: Donald J. Acklam; David Bird, both of Lancashire; Graham A. Hill, Warton, all of England

[73] Assignee: British Aerospace Public Limited Company, London, England

[21] Appl. No.: 460,264

[22] Filed: Jan. 24, 1983

[30] Foreign Application Priority Data

Jan. 22, 1982 [GB] United Kingdom ................. 8201907
Oct. 22, 1982 [GB] United Kingdom ................. 8230312

[51] Int. Cl.³ ............................................. G05B 19/40
[52] U.S. Cl. .................................. 318/685; 318/628; 318/584; 318/687; 244/223
[58] Field of Search ................ 244/223; 318/696, 561, 318/580, 646, 685, 584, 628, 687

[56] References Cited

U.S. PATENT DOCUMENTS

| | | | |
|---|---|---|---|
| 3,033,495 | 5/1962 | Sikora | 244/233 X |
| 4,278,920 | 7/1981 | Ruoff, Jr. | 318/646 X |
| 4,345,195 | 8/1982 | Griffith et al. | 318/580 XP |
| 4,404,626 | 9/1983 | Aoyama | 318/561 X |
| 4,426,607 | 1/1984 | Black et al. | 318/584 X |

FOREIGN PATENT DOCUMENTS 2073887 10/1981 United Kingdom .

Primary Examiner—Dobeck B.
Attorney, Agent, or Firm—Cushman, Darby & Cushman

[57] ABSTRACT

Control apparatus of the kind disclosed in our U.K. patent application No. 2173887 wherein the 'mover' or rotor of a linear or rotary electrical stepper motor is coupled to a manual operating member so that, not only can the motor drive the operating member to give an automatic mode of the apparatus, but can exert a controlled resistance to manual movement of the operating member thereby giving a degree of 'feel' to the operator and/or one or more electrically generated discreet detent positions within the range of movement. Herein the apparatus incorporates an improvement whereby the movable operating member is pivotably mounted so that the manual movement is arcuate—flexible cables connected to the drive motor mover and/or control switches incorporated in the operating member can pass from the operating member to a fixed part of the apparatus at or near the pivotable mounting where the movement to be taken up is less.

3 Claims, 13 Drawing Figures

CONTROL APPARATUS

United Kingdom Patent application No. 2,073,887A, published Oct. 21, 1981 and having a U.S. counterpart in the name of KAYE, Ser. No. 242,564 filed Mar. 11, 1981, now abandoned, and Ser. No. 625,187, filed June 22, 1984, discloses control apparatus, for example an aircraft thrust demand unit or "throttle-box", wherein a manually movable operating member or lever is operable to be moved to effect a control action, for example via a position encoder and a suitable control signal link with the apparatus to be controlled or possibly via a more or less complex mechanical coupling, and wherein the operating member is associated with an electric motor of which the member may form a part and which is preferably a stepper motor or even better a described kind of linear stepper motor. The arrangement is such that, while the motor may be energised to move the operating member and hence provide an automatic control mode of the apparatus the motor is nevertheless overridable manually without disengaging or de-clutching the motor. Instead of or in addition to being able to move the operating member or lever, the motor may be operable to provide a measure of resistance or "feel" to manual movement of the member and/or to introduce a more marked resistance to such movement through certain predetermined detent positions in its range of movement.

According to one aspect of the present invention, there is provided apparatus comprising a fixed support member, a movable member supported by the support member for movement with respect to the support member, electrical motor means of which a stator part is connected to said support member and a mover part is connected to said movable member, and energisation supply means for controlling the energisation of the windings of said motor means to produce a controlled form of resistance to movement of said movable member.

By way of example, said apparatus may form part of control apparatus in which the movable member is a manually movable control member, for example a motor vehicle accelerator or clutch pedal, or a manual control lever or the like on an aircraft, boat and so on, and wherein the control of said electrical motor is such as to produce one or more controllable detent positions in the movement of the member and/or a controllable overall resistance which may or may not be constant throughout the range of movement of the member. The position of the or each detent and the extent and distribution of the resistance to movement may be controlled according to external conditions. For example in a motor vehicle a detent position in the accelerator pedal movement may be varied according to road conditions and other vehicle operating conditions so as to always be indicative of an optimum pedal position for fuel economy say. In an aircraft, a detent position in the movement of a throttle control lever may be varied according to conditions such as the altitude of the aircraft and so on while general resistance to movement of the lever may be increased when the plane has just landed say.

Alternatively the detent positions and the extent and distribution of the movement resistance may be programmed into the energisation supply means on a permanent or semi-permanent basis, the object being to make the movement of the movable member subject to some predetermined characteristics. For example, the apparatus may be operable as a so-called "feel unit" for an aircraft control for which the response by the aircraft to movement of the control may not be linear or which may be coupled to the device to be controlled by way of a high-gain servo-system. Then, the feel unit may be such as to give a feel force which varies in a predetermined way through the range of movement of the control so as to compensate for the non-linearity or simple lack of feel in a high-gain servo system. As a further example, the apparatus could be used as a research and development tool in connection with suspension systems for road vehicles say—in general, it may be adapted to have the characteristics of any linear or non-linear spring or spring/damper system.

According to another aspect of the invention there is provided control apparatus wherein a movable member is movable to effect a control function and wherein the apparatus incorporates electrical motor means for moving the movable member in an automatic mode of the apparatus and/or for generating a general or localised resistance to movement of the member other than by the motor, the apparatus incorporating wireless data transmission means for transmitting data between a moving part of said apparatus and fixed data processing means associated therewith.

According to a third aspect of the invention, there is provided control apparatus including a movable member which is movable to execute a control function and electrical motor means including a mover part coupled to said movable member, the motor means being operable for driving the movable member in an automatic mode of the apparatus and/or for generating a general or localised resistance to such movement other than by the motor means, the electrical motor means being such that the force for said driving or said resistance generating is producible by the application of power to windings forming part of the stator part of the motor.

According to a fourth aspect of the invention, there is provided control apparatus including electrical motor means for driving the movement of a movable control member, and sensing means for sensing the execution of a commanded movement of the control member, the sensing means comprising strain gauge means coupled to the stator and/or mover of the motor means to sense strain and/or extraneous movement thereof.

Figure 2:
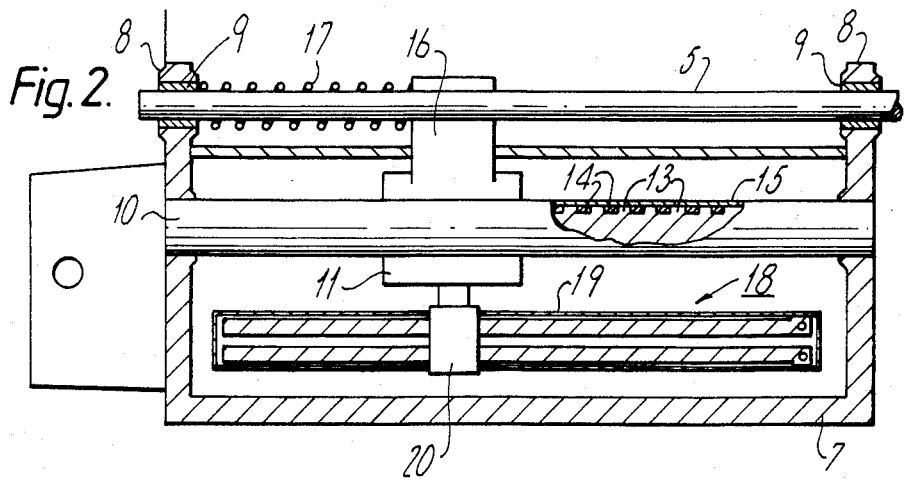
Figure 3:
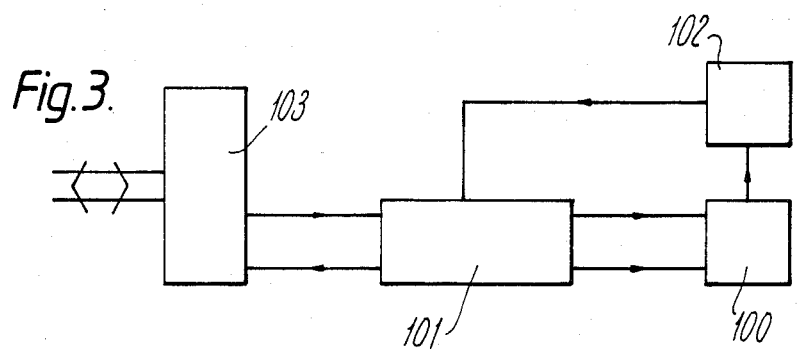
Figure 4:
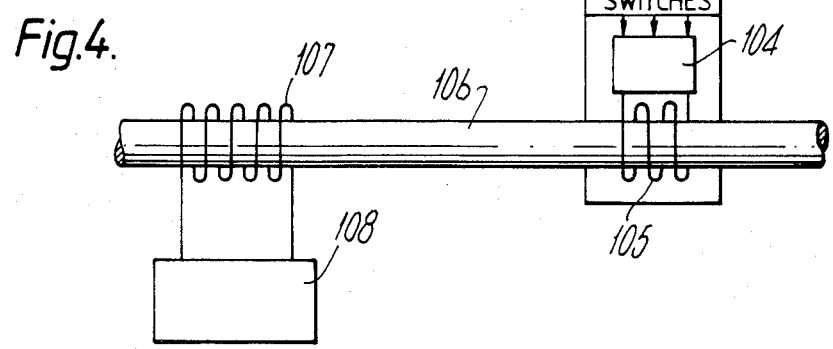

For a better understanding of the invention, reference will now be made by way of example to the accompanying drawings, in which:

FIG. 1 is a diagrammatic view of an accelerator control for a motor vehicle, the control being coupled to a device for generating an advisory detent position in the movement of the control, FIG. 2 is a sectional view of the detent force generating device of FIG. 1, FIG. 3 is a block diagram of a system for generating one or more detents and/or a feel force in association with the movement of a control member, and FIG. 4 is a simplified diagram of part of an aircraft throttle box.

Figure 5:
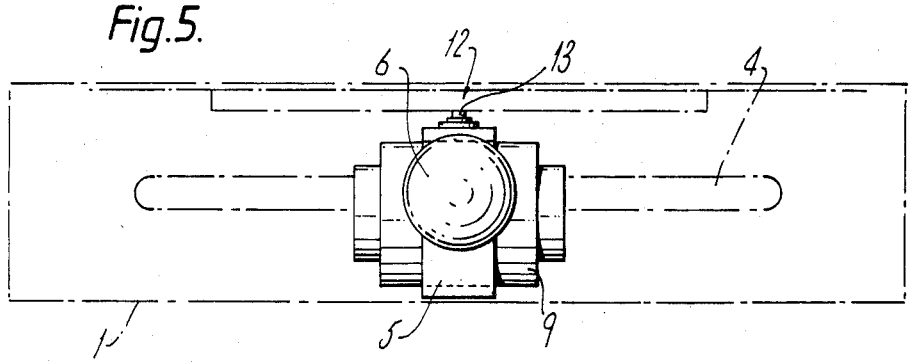
Figure 6:
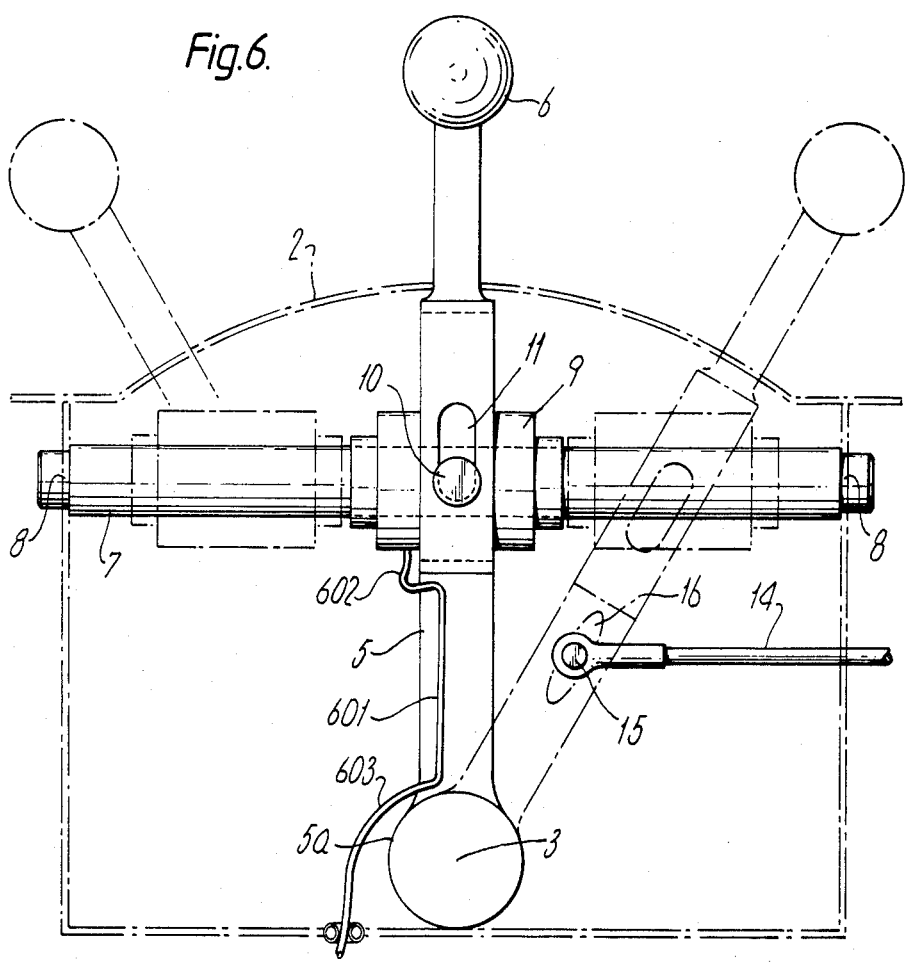
Figure 9:
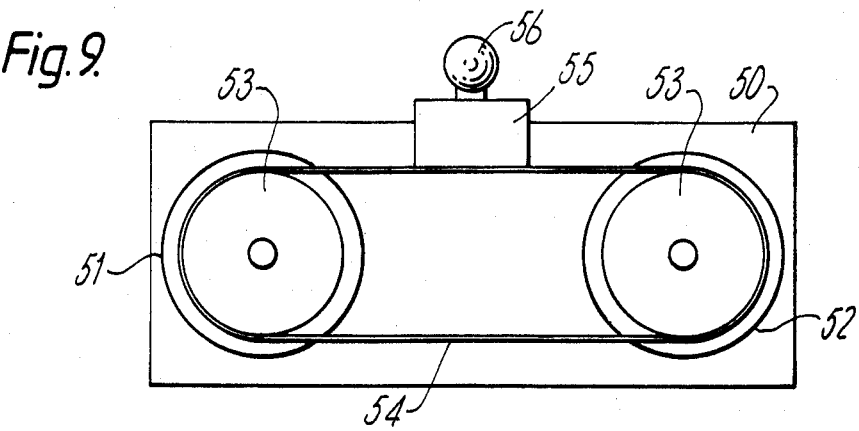
Figure 10:
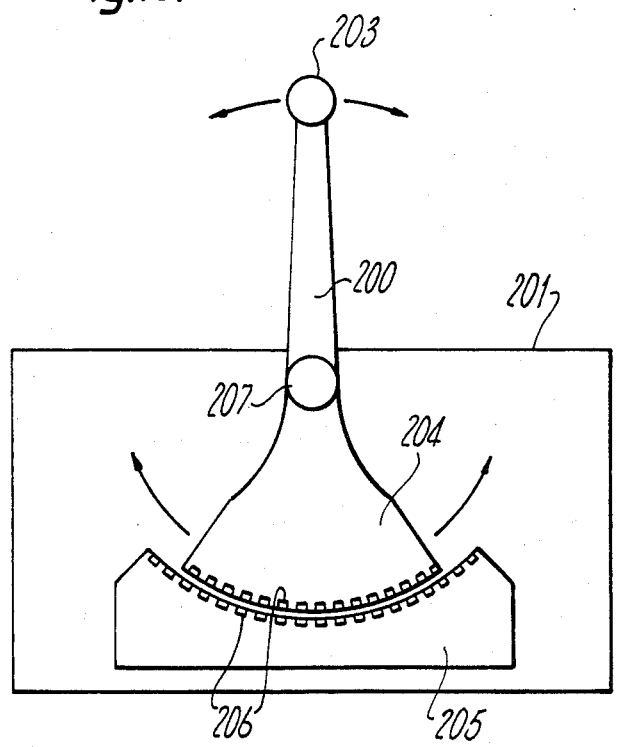
Figure 11:
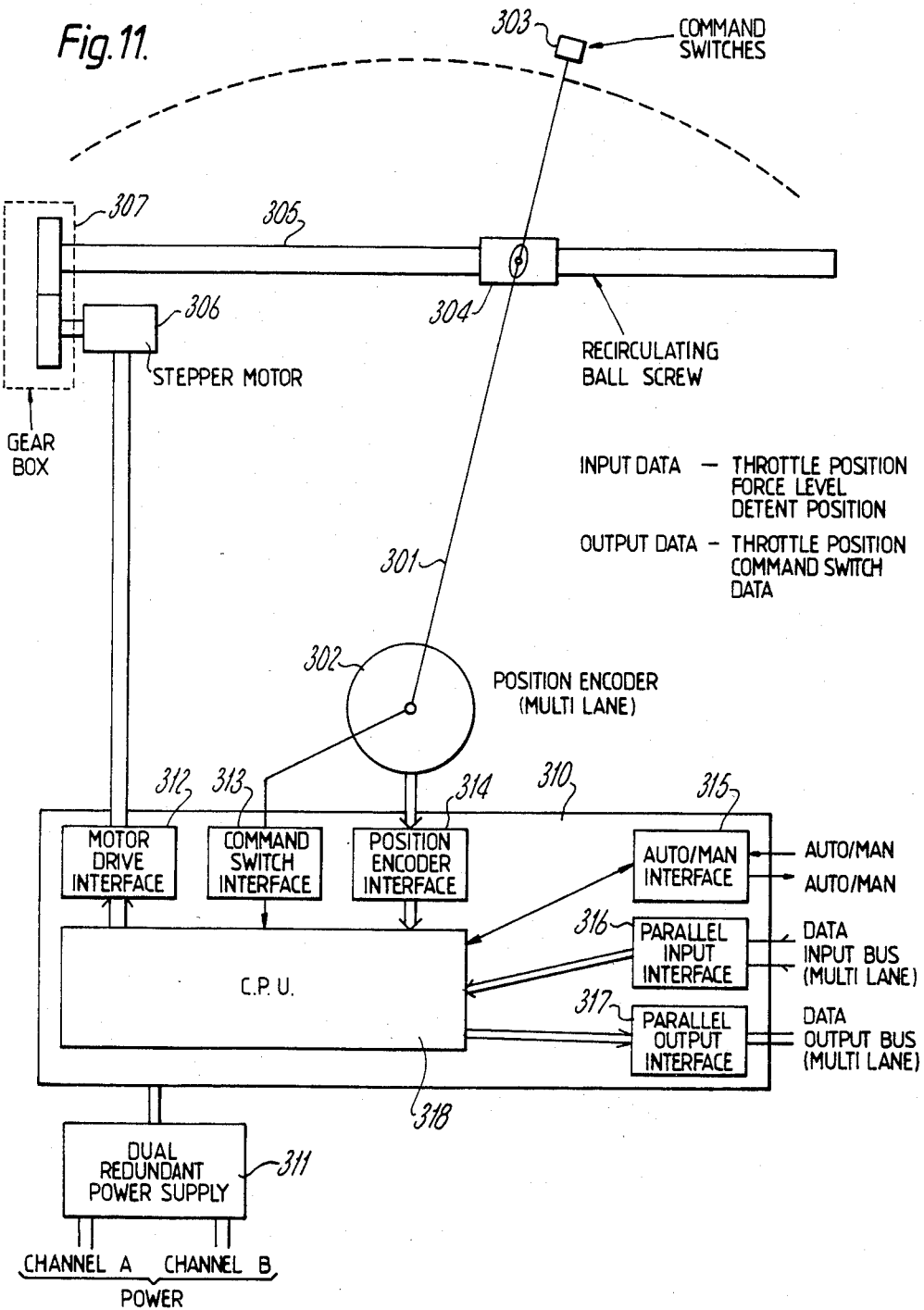
Figure 12:
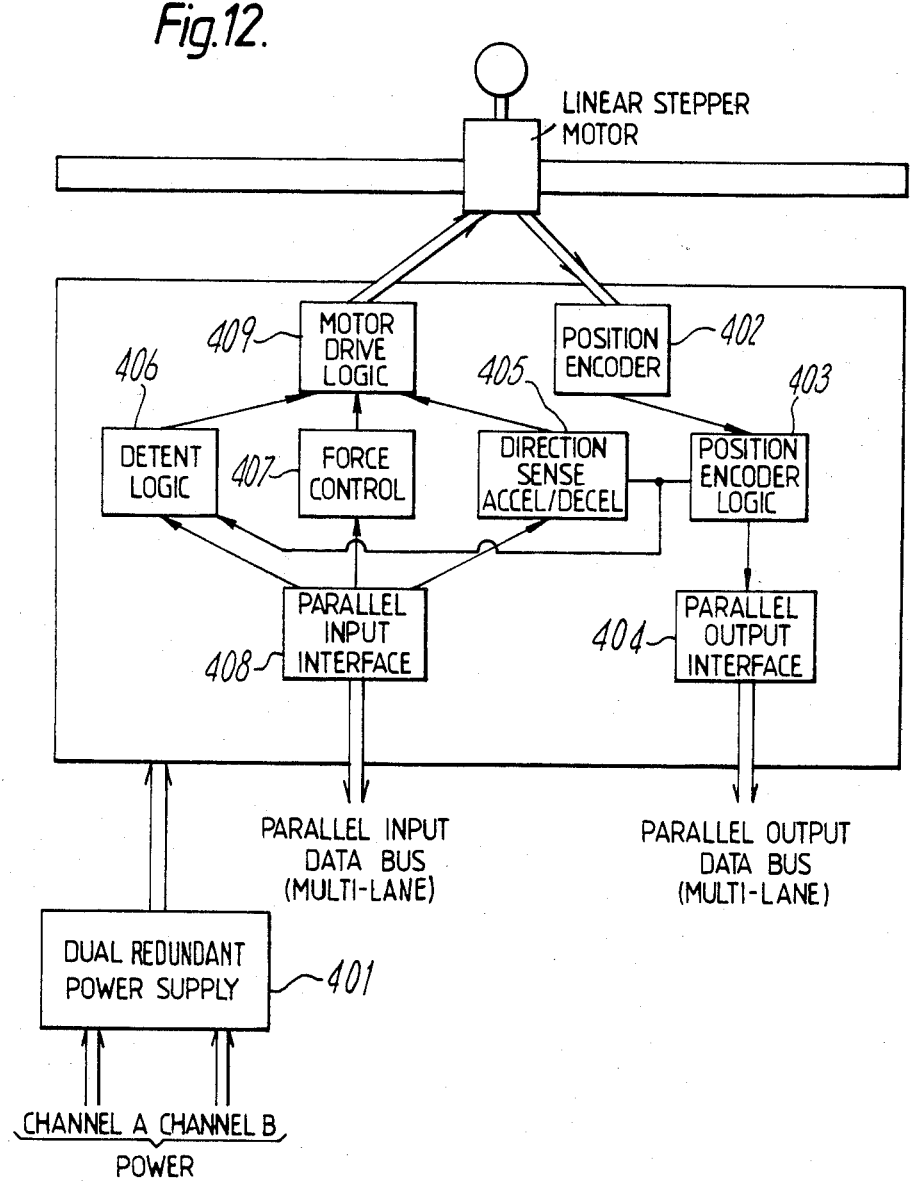
Figure 13:
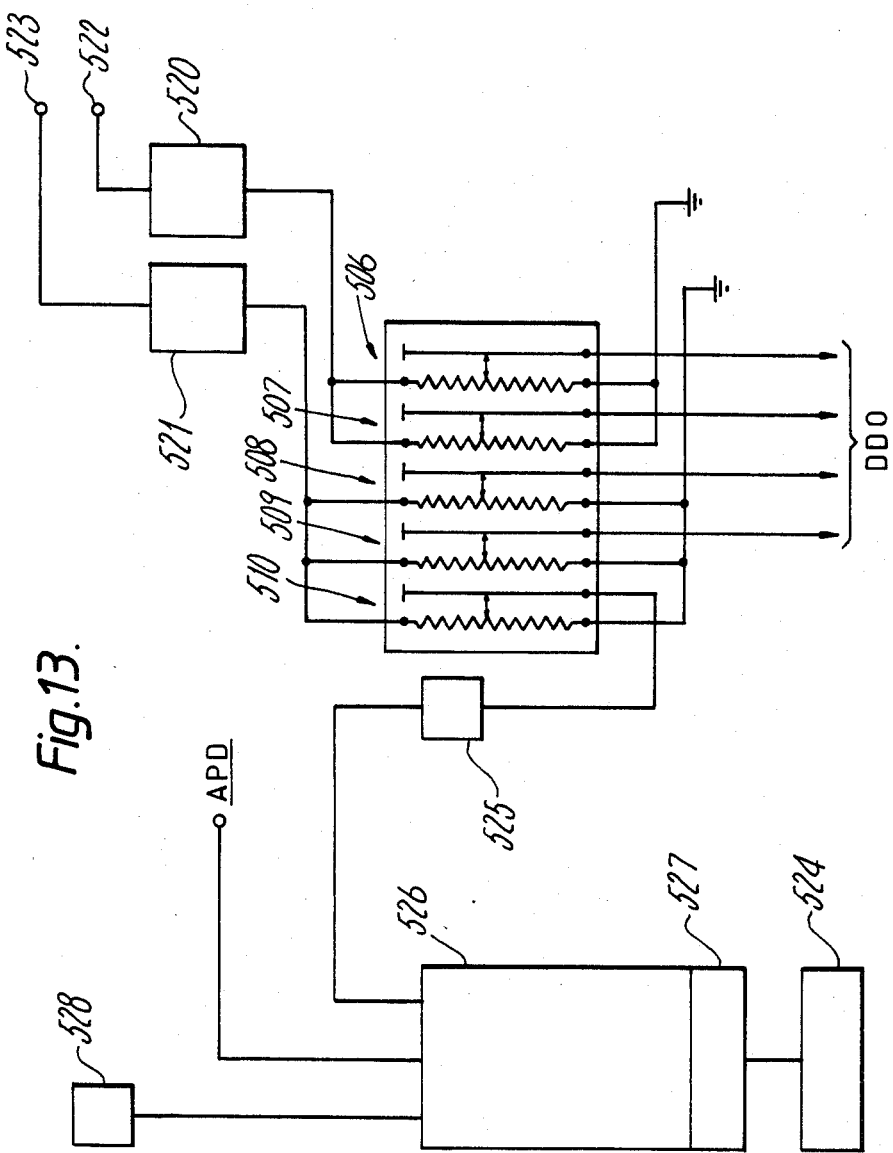

FIGS. 5 and 6 are a sectional plan and a sectional elevation of a control device, FIGS. 7, 8, 9 and 10 are diagrammatic views of respective further control devices and FIGS. 11, 12 and 13 are simplified circuit diagrams of respective drive/interface circuits for use in conjunction with control devices.

Referring to FIG. 1, a motor vehicle may comprise a series of transducers (not shown) for forming electrical signals indicative of respective operating conditions of the vehicle and a signal processing device 1 for receiving those signals and using them to determine a vehicle control setting which, given the relevant conditions, optimises some predetermined further operating parameter. Thus, in the illustrated case, the transducers indicate the road speed of the vehicle and the speed of its engine, the selected driving gear, engine and air temperature, and the pressure of the air or fuel/air mixture within the engine inlet manifold. The signal processing device, which may comprise a microprocessor based computer system, determines from these parameters a throttle setting to give maximum fuel economy. By way of example, the signal processing device could be operable, in dependence upon the signals it receives, to select an accelerator setting value from a stored set of such values, i.e. a kind of look-up table, the stored values having been derived by separate experimentation with the same or a similar vehicle and engine over appropriate ranges and combinations of the likely operating conditions. The signal processing device may be operable simply to select the most nearly appropriate value from the look-up table or it may be operable to interpolate between these values in ways known in connection with look-up table operation of computer systems. Alternatively, in cases where fuel economy is linked to values of the transduced operating conditions and the accelerator setting by electronically calculable functions, the signal processing device may be operable to calculate the optimum accelerator setting directly from the transduced conditions, or possibly the device may operate by a combination of direct calculation and reference to a look-up table.

The accelerator control shown comprises the usual foot pedal 2 connected by say a Bowden cable (not shown) to the engine speed control device, for example to a carburettor valve. The pedal is supported by a pivot mounting 3 and pivotably connected to the pedal near the foot engaging portion 4 thereof, is one end of a shaft 5 by which the pedal is coupled to a detent force generating device 6.

Referring to FIGS. 1 and 2 together, the device 6 comprises an elongate box-like housing 7 which has two lugs 8 extending from one side thereof at opposite ends of the housing and of which one end is pivotably connected to the cabin/engine compartment bulkhead 21 of the vehicle. The shaft 5 is mounted in two bearing bushes 9 supported by respective ones of the lugs and is able to move in the direction of its axis in response to movement of the accelerator pedal.

Within the housing 7 are contained the stator 10 and mover 11 of a linear stepper motor of the kind disclosed in our U.S. patent application Ser. No. 2,073,887A. The stator 10 consists of an elongate cylindrical member 12 made of magnetisable material and formed with a series of annular recesses to leave defined intervening pole teeth 13. The recesses are filled with non-magnetic material 14, such as copper, and the whole is covered by a thin plating 15 of material having good sliding properties, chromium for example. Meanwhile the stator 10 comprises a cylindrical housing within which is mounted an electro-magnetic pole assembly. This pole assembly is not shown but, as described in U.S. patent application Ser. No. 2,073,887 to which attention is directed, it may comprise two ring-shaped poles each carrying a winding and each having two spaced sets of annular grooves in its internal surface to define respective sets of pole teeth. Between the poles is a magnet assembly including a rare-earth permanent magnet. The pitch and spacing of the mover pole tooth sets and the stator pole tooth pitch are such that, by properly sequencing the energisation of the mover windings, the mover can be stepped along the stator between adjacent ones of a series of positions at which the reluctance to flow of magnetic flux energy between mover and stator is a minimum. While the mover is at one of these minimum reluctance positions, the force needed to move it out of that position depends on the level of energisation applied to the windings. Thus, as mentioned in the aforementioned patent application, the resistance to manual movement of the mover can be varied to give a desired level of "feel" in that movement and/or, when the mover is being manually moved through one or more predetermined positions in its range, the winding energisation can be increased from a normal standing level so as to generate a marked resistance or "detent" at that or those positions.

Connected to the mover is an actuator arm 16 which extends from an elongate slot in the housing wall between the lugs 8 and is there attached to shaft 5. A compression spring 17 is engaged around shaft 5 to act between arm 16 and that one of the lugs 8 which is furthest from the pedal 2.

Within the housing 7, the mover 10 is coupled to a position encoder 18 which, in this case takes the form of a potentiometer with a resistive and a conductive track formed on a fixed substrate 19 and a bridging contact 20 movable with the mover 10 so as to bridge the tracks at a position dependent upon the position of the mover and thereby give a resistance value between the track end terminals which is also dependent upon the mover position. The encoder may have more than one pair of tracks and bridging contact in order to give a degree of redundancy. Alternatively, any other suitable form of position encoder may be used, for example any of those disclosed in U.S. patent application Ser. No. 2,073,887A.

The device 1 is constructed and/or programmed to compare the instant position of the mover 10, and hence in effect the instant position of pedal 2, with the optimum position determined from the transduced operating conditions as described earlier. On the basis of the comparison, the device so controls the energisation of the windings of mover 10 that depression of the pedal down to the optimum position is comparatively easy while movement past this point is met by a resistance which, although substantially increased, can nevertheless be overcome if desired.

It will of course be appreciated that the point at which the increased resistance is felt is not fixed as would be the case if some simple mechanical detent system were coupled to the accelerator pedal. Rather the detent position with the described apparatus is varied so as to indicate the optimum accelerator position or optimum maximum accelerator for a range of the other operating conditions.

If desired, the described apparatus can be provided with additional facilities such as the ability to maintain a particular accelerator position. For this, a driver control switch 22 is provided and, when operated, this instructs the device 1 to increase the winding energisation of mover 10 to a level at which the pedal 2 is held in position against the return force of spring 17 and any other springs which may be included in the accelerator control linkage.

Instead of just holding the pedal position, the processor device 1 could act to maintain the road speed of the vehicle constant. For this, the device 1 could register the transduced signal representing road speed at the time when control switch 22 is operated and then, on the basis of a comparison between the registered and present value of the road speed signal, could so energise the windings of mover 10 when necessary that the mover is actually driven along the stator, the position of pedal 2 being thereby adjusted to maintain road speed constant. While a constant road speed mode is selected, the device 1 could be operable, on the basis of engine speed for example, to sense the desirability of a gear change, particularly the desirability of selecting a lower gear sometimes in order to hold the desired speed, and to indicate this to the driver via a suitable warning indicator 23, for example an audible warning device and/or a lamp. If desired, override switch means 24 can be arranged to sense any manual operation of one or more of the clutch, brake and accelerator controls of the vehicle and to then initiate overriding disengagement of the speed holding mode of device 1 whatever the state of switch 22.

The illustrated apparatus could be used for road vehicles as described but also for railway locomotives particularly advantageous for road or rail vehicles having automatic transmissions (in which case the gear selection warning device may not be needed). The apparatus could also be used for boats and even aircraft. In the case of those propellor, fan or screw driven vehicles where speed control is by varying the blade pitch while the engine speed is automatically kept constant, the detent force generating device 6 would of course be coupled to the pitch control.

The transduced parameters fed to device 1 are of course given only by way of examples as is the parameter to be optimised. The transduced parameters depend upon the parameter to be optimised and, even for a particular parameter, depend upon the kind of vehicle and may also be a matter of choice made on an economic basis for example. Thus, some indication of a maximum economy accelerator position can be obtained from the inlet manifold pressure alone of a car engine and hence a simplified version of the illustrated apparatus may comprise only a transducer for this parameter.

Instead of the linear stepper motor shown, the detent force generating device 6 could comprise a rotary stepping motor connected via a rotary/linear motion converter to shaft 5 or coupled, without rotary/linear conversion, to the pedal 2, for example directly to the pedal at its pivot point. Further, instead of a rotary or linear stepper motor, any other suitable kind of motor may be usable or, at least for some embodiments, even a suitable electromagnetic assembly which, although it would comprise electromagnetically interactive moving and fixed parts whereby a varying level of resistance to relative movement may be generated, may not be recognisable as a motor in the usual meaning of that term.

A force generating device of the kind shown herein or modified as disclosed, could be used to provide "feel" and/or detent positions for any kind of manually movable member. For example, in FIG. 1, the pedal 2 could be the clutch control pedal instead of the accelerator pedal and the devices 1 and 6 could be operable to provide a measure of feel force to operation of the pedal, advantageously a force which varies according to the pedal position and/or the actual degree of engagement of the clutch itself so as to encourage operation of the pedal in a way which reduces wear and tear of the clutch. This would be particularly useful in a large vehicle such as a rear-engined bus with a remote control clutch.

As a further example, the apparatus shown could be used as a feel unit for the control column of an aircraft. For this application, mechanical feel-force generating arrangements are known—the illustrated apparatus would have the advantage of easy modification of the system characteristics. If device 1 comprises a computer system, then simple variation of its programming could achieve this modification.

Apparatus including the device 6 along with appropriate control circuitry such as a computer could be adapted to operate as a spring and/or damper system with characteristics controlled by the computer. The apparatus could then be used for say the development of car suspension systems or possibly could form a permanent part of such a suspension system so as to give some desired characteristic thereof.

In general, i.e. including in relation to the apparatus and possible applications and modifications hereinbefore described and the apparatus and possible applications and modifications described in U.S. patent application Ser. Nos. 2,073,887A and, the "feel unit", i.e. the electric motor-like device which generates the desired movement resistance and/or detents and which may also be operable to drive the movement of a movable member, may be incorporated in an overall system such as that shown in FIG. 3 where reference 100 indicates the feel unit and an energisation controller 101 is operable to supply driving/control signals for this unit on the basis of information received by the controller both from a position sensing device 102 coupled to the feel unit and from a suitable input/output interface unit 103 which interfaces the overall system to external influences. Thus, the position at which the moving member of the feel unit 100 in relation to the stationary member feels a detent force, and the magnitude of that force, may be controlled by the motor controller 101. The detent force may operate for a defined proportion of the available travel of the moving member at the same or a varying force level. Signals from external sources are sent to the electronic interface unit 103 and operated upon according to requirement, to produce signals for the motor control unit 101 which will define the magnitude, position and characteristic form of the detent. For example in the case of an aircraft throttle box, the position of say a "MAX DRY" detent i.e. a throttle position at which there is attained maximum thrust without say any afterburning system or other thrust supplement system in operation, can be varied as a function of altitude.

In another example the base level "friction" force that resists the motion of the moving member can be increased when the throttle handle is in idle position and signals are received at the interface circuit indicating that the aircraft undercarriage is down and aircraft weight is actually on the ground. By such a means it can be ensured that if, on landing, the aircraft is subject to sudden deceleration, the throttle handles are not thrown forward. It will be realised that the detent position(s) and feel force can be changed continuously as a function of vehicle speed, altitude or any other desired parameters or combination of parameters.

The interface unit 103 is not always used, of course. Instead, the position and magnitude of the detent force or forces may be simply programmed into the controller 101 so that the force generated on the moving member varies as a function of position, speed of movement and direction of movement of the moving member. This is the case for example when the object is to simulate the action of a mechanical "feel" system of any characteristic from a simple spring with or without damping to a more complex non-linear system. An interface unit could be provided in such a system if desired. Then it would be possible to change the characteristics of the system in response to external signals received at the interface.

In the embodiments of the invention particularly described and illustrated by FIGS. 1 to 4 in the drawings of application No. 2,073,887A, the "mover" of the feel unit motor had the electromagnetic windings and so power to drive the unit was applied, to the mover by way of flexible wiring. To avoid the need for such wiring and possible damage thereto consequent upon its bending as the mover moves it is proposed that the motor drive system be designed in such a manner so as to allow power to be applied to the stationary member or stator of the feel unit.

As mentioned in 2,073,887A, the handle or grip portion of an aircraft throttle-box may incorporate control switches, for example a switch for operating a reverse-thrust mechanism of the aircraft. In this case, and any other where switches and/or indicators are incorporated in or connected to the "movable" member of the feel unit, the need for wiring coupled to the movable member may be removed by use of a wireless data transmission system between the mover and fixed data processing circuitry incorporated in the unit, for example mounted on the "stator" of the unit. Thus, as shown in FIG. 4, the switch information could be encoded by circuit 104 onto an AC signal which is fed into a coil 105 mounted in the moving member and wound around magnetic bar 106 along which the moving member travels. Another coil 107 attached to the stationary member would also be wound around the magnetic bar in a fixed position and would receive the encoded alternating signal and pass it to the data processing circuitry 108 for analysis.

Data could be passed either from the moving member to the stationary member or from the stationary to the moving member in a multiplexed manner. Power for the circuitry in the moving member could be derived from the data transmission signal used to communicate from stationary to moving member and, with the use of very low power electronic circuitry, could provide sufficient power during the communication between moving and stationary member. The power in the moving member would be replenished during the next transmission from stationary to moving member.

It may be desirable for a control device such as a microprocessor based computer system which is controlling a stepper motor to receive an indication that the mover of the motor has in fact executed a step or series of steps commanded by the control device. For this purpose, application No. 2,073,887A disclosed the idea of comparing the e.m.f. appearing across each motor winding with a waveform corresponding to what would appear across the motor winding if the commanded step were executed (this waveform is different to that which appears if the step is not executed because of the influence of movement-induced e.m.f.).

As a further possibility, the execution or otherwise of a commanded step can be detected by coupling a strain-gauge to the motor stator or incorporating such a gauge in the mover so as to sense the small strains and extraneous movements which occur in the motor elements during its operation.

FIGS. 5 and 6 of the accompanying drawings show, in sectional plan and sectional elevation, respectively and in diagrammatic form a control device which could form the basis of say an aircraft throttle-box. The device comprises a box 1 which, in plan, is rectangular and of which the top 2 is curved with respect to axis 3 and has a longitudinally extending slot 4 in it. Mounted to shaft 5a for pivoting movement about axis 3 is a lever 5 which extends out through slot 4 and is there fitted with a grip handle or knob 6. Thus, the lever can be moved through the range of which the extremes are shown by the chain-lined representations of the lever.

Mounted within box 1 next to lever 5 is the stator rod 7 of a linear stepper motor of the kind disclosed and illustrated in our U.S. patent application Ser. No. 2,073,887A. The rod is fixed by having its ends 8, which are stepped, entered into respective holes in the ends of the box. The moving element or 'mover' 9 of the stepper motor has a projecting peg 10 which extends into a slot 11 in the lever 5. Thus, as the lever 5 is manually moved, the mover 9 moves with it along rod 7 and, if the mover 9 is driven along rod 7, it moves the lever 5. As in application No. 2,073,887A, during manual movement of lever 5, the stepper motor may be operable to provide a fixed, variable or programmed degree of 'feel' to the manual movement.

In order to transmit the control action to whatever apparatus is being controlled, e.g. the aircraft engine controller if the device shown is a throttle-box, an electronic or mechanical linkage or both can be provided. The device shown has both. The electronic linkage comprises any suitable kind of linear position encoder fixed in box 1 and including a fixed element 12 and a movable element 13 coupled to motor mover 9. By way of example, the encoder could be an Inductosyn type of encoder, a linear potentiometer, or a light-operated type of encoder. The mechanical back-up linkage includes a push-pull rod 14 pivotably coupled to lever 5, the pivot pin 15 extending through a slotted hole 16 in lever 5.

As an alternative to what is shown, the position encoder could be a rotary position encoder coupled to the lever 5, directly or via say a gear arrangement, at the pivot point 3. The mechanical linkage could also comprise any form of rotary coupling, say a gear drive belt and pulley, or a reel which winds up a Bowden cable coupled to lever 5 via its supporting shaft 5a.

The device shown, with suitable modification possibly, could be used for various control applications. For example, it could be adapted for foot-operation and then be operable for controlling the accelerator of a road vehicle.

Figure 7:
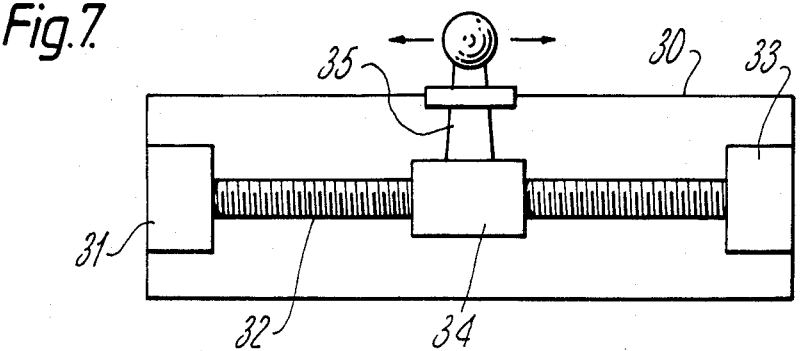
Figure 8:
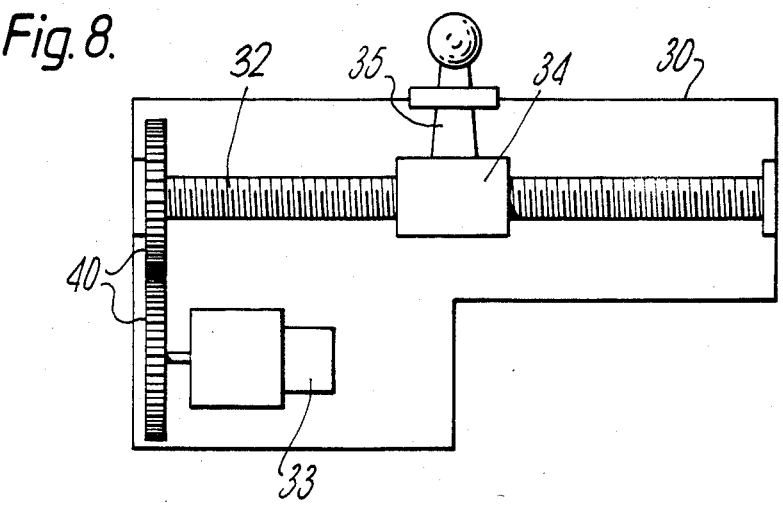

FIGS. 7, 8 and 9 of the drawings show respective further control devices in diagrammatic form. In FIG. 3, a box 30 with a slotted top contains a rotary stepper motor 31 of which the rotor (not shown) is coupled to one end of a ball screw 32. The other end of the screw 32 is coupled to the input shaft of a rotary position encoder 33 and the screw carries, engaged with the screw so that it moves back and forth along the screw when the latter rotates, a rider member 34 having a grip lever 35 extending therefrom and out of the slot in the top of the box. As before then, motor 31 can rotate to move lever 35 and to exert the desired control action via encoder 33, the operation of the motor nevertheless being manually overridable by forced manual movement of the lever. Also, when the lever is being manually moved normally, the motor can provide the required degree or variation of feel to that movement.

FIG. 8 is similar to FIG. 7 except for the slight modification whereby the motor 31 is positioned below screw 32 and is coupled thereto via a gear train 40 and the encoder 33 is coupled directly to the motor shaft.

A ball screw, which is a known item can have a very low coefficient of friction and is 'reversible' (i.e. if rotated it moves the rider and, if the rider is moved, the screw is rotated) even for quite fine pitches of the screw. Hence, such a screw is well suited to use in a control device as shown. The encoder used can be a multiturn encoder suitably chosen from say the range supplied by say Muirhead Vactric.

As will be realised, the devices shown in FIGS. 7 and 8 can be configured in various ways whilst still retaining the feature of a rotary motor and screw rod, preferably a ball-screw, coupled to a rider which is in turn coupled to a manual operating lever or knob.

FIG. 9 shows a box 50, again with a slotted top, and containing a rotary stepper motor 51 and a rotary position encoder 52 each coupled to a toothedbelt wheel 53. A toothed belt 54 is entrained round the wheels 53 and couples them together and the belt is also coupled to a rider 55 from which a manual operating lever 56 extends through the slot in box 50.

Using rotary motors and encoders is considered better than using linear devices because thereby it may be easier to carry out proper dirt and moisture exclusion sealing in the various components and the device as a whole. Also by using 'multiturn' rotary components, resolution and such may be able to be improved and it may be easier, for example by proper use of gears, ball-screws and such, to obtain mechanical advantage enabling motors and such to be smaller or less powerful.

The control device of FIG. 10 comprises a lever 200 of which one end protrudes from a housing 201 and is formed with a grip portion 203 and of which the other end, inside the housing, has affixed to it the rotor or mover part 204 of a segmental stepper motor, which motor also comprises an arcuate stator 205. Respective curved surfaces 206 of the mover 204 and stator 205 face each other and are formed with pole teeth and the lever 200 is pivoted for movement about an axis 207 at the centre of curvature of the surfaces 206. When energised by supply means (not shown), the surfaces 206 move relative to one another or produce a feel force between each other which produces a corresponding movement or feel force for the lever 200.

FIG. 11 shows diagrammatically an aircraft throttle box wherein a lever 301 is connected at one end to the shaft of a rotary position encoder 302 so that the lever can pivot about the axis of the encoder shaft. The encoder 302 is preferably of the multiple-channel type so as to give a plurality of position indicative output signals which normally are substantially the same—the object of course being to give a required degree of redundancy. The other end of lever 301 protrudes from the throttle box housing (not shown) and is there fitted with a manual grip portion 303 which, in turn is fitted with a plurality of control switches, for example a switch for bringing in the reverse thrust mechanism of the aircraft and so on. An intermediate portion of the lever 301 is pivotably connected to the 'nut', i.e. the linearly moving female part, 304 of a recirculating ball-screw assembly which also comprises a threaded rod 305 along which the nut moves when rod 305 is rotated. Rod 305 is coupled to a rotary stepper motor 306 via gearbox 307. As with previous embodiments described herein, the lever 301 can be moved manually to exert a control action on the engine of an aircraft in which the throttle box is fitted, in which case the stepper motor 306, via gearbox 307 and the ball-screw assembly, can be so energised and controlled that it provides a controlled feel force resisting the manual movement and/or controllable or programmable detents, i.e. noticeably greater resistance to movement at certain positions within the overall range of movement of the lever. Also, the stepper motor can actually move the lever 301 under the control of the aircraft autopilot.

In order to interface the throttle box to the autopilot computers, the engine speed control computer, and local controllers for the various items to be controlled by the switches on grip portion 303, an interface/control unit 310 is provided. This is powered by its own dual redundant power supply unit 311 from respective independent aircraft power source channels A and B and it comprises a series of digital interface units 312 to 317 and central processor unit 318 which may comprise a microprocessor based computer system. The interface unit 312 interfaces unit 318 to the stepper motor and hence of course is constructed to provide appropriate energisation signals for driving the motor as known in the art, or for providing reduced level energisation signals to produce the aforementioned feel and detent forces. The other interface units handle various control and information signals. Thus, unit 313 is connected between the unit 318 and the grip switches, unit 314 passes the position encoder signals to the unit 318 from encoder 302, unit 315 transfers to the unit 318 from the autopilot or to the autopilot from unit 318 signals indicative of whether the throttle box is in its manual or automatic state of operation, and the interface units 316 and 317 are respectively parallel input and output interfaces which connect the unit 318 to aircraft data buses (not shown), these data bases also communicating with the aircraft autopilot, throttle control computers and local controllers as known in the art.

The central processor unit 318 is programmed to handle the transfer of signals between the various interface units as necessary and to carry out the sequencing of the winding drive signals for the stepper motor to give the required direction and amount of movement. In autopilot mode, when a change in throttle position is required, the aircraft autopilot passes to the unit 318 a demanded absolute position of the throttle control grip. The unit 318 then calculates the amount and direction of movement required to get the grip to that new demanded position from its present position and then outputs the appropriate drive pulse sequence to the motor. It also controls the frequency of the pulse sequence to give a smooth movement, i.e. with an initial increase of frequency up to some predetermined value then a constant frequency period and then a smooth reduction. As a result the movement comprises an initial acceleration phase, an intermediate constant speed phase and then a smooth deceleration to a standstill at the new position. The calculation of the acceleration and deceleration rates and times is done so as to optimise the time taken to reach the new position without exceeding any predetermined maximum rates. The unit 318 also receives from the aircraft computers signals indicating the positions at which there are to be generated detents to manual movement of the control grip, and the level of resistance to movement which is to be encountered at those positions. If the throttle box is in manual mode, the unit 318 maintains a comparison of the actual grip position and the demanded detent position(s) and, if and when the grip is moved through a detent, it initiates an increased motor energisation level to give the desired detent resistance. The demanded detent position is calculated by the aircraft computer on the basis of say instant navigation and operating parameters of the aircraft.

For a throttle box comprising a linear stepper motor of the kind illustrated in say FIG. 2 herein, the interface/control unit could be as shown in FIG. 12. This unit is again energised by a dual redundant power supply 401 and interfaces the throttle box to input and output data buses (preferably multiple channel buses to give a degree of redundancy as known in the art) which communicate with the aircraft autopilot and throttle control computers. The throttle box position encoder 402 is shown as a block and can be of any suitable form, e.g. a linear potentiometric type of device as shown in FIG. 2, and the position indicative signal therefrom is fed to an encoder logic unit 403 which in turn feeds an output data bus interface unit 404 and a direction sensing and acceleration/deceleration control unit 405. The unit 405 is interposed, along with a detent logic unit 406 and force control unit 407 between a parallel input interface 408 for the input data bus and a motor drive logic unit 409 which actually provides the energisation signals for the throttle box stepper motor. The unit 405 provides, in any automatic movement of the motor, acceleration and deceleration phases to ensure smoothness of that movement and also determines the direction in which the motor must move in order to get the grip portion of the throttle box from its instant position to a new position demanded by the aircraft computer via the input bus and interface 408. When in the manual mode, the unit 405 also senses the direction of any manual movement of the grip, i.e. by sensing the direction of change of the position encoder signal, and controls the drive logic 409 to ensure an appropriate energisation sequence of the motor windings either for generating the required resisting feel force or, possibly, if the pilot prefers it, an assisting force which reduces the manual force required to move the grip. The force control unit determines the general level of energisation of the motor windings in response to aircraft computer supplied signals indicative of the general feel force, detent force and/or movement forces required, while the detent logic unit senses when the grip is being manually moved through a detent position (which detent position has been communicated to it by the aircraft computer) and then initiates the production of the winding energisation level appropriate to generate the detent.

As will be appreciated, in either of FIGS. 11 and 12, any desired level of redundancy may be incorporated. For example, in FIG. 11 each output channel of the encoder could be coupled to a respective separate interface/control unit like the one shown, each unit incorporating its own central processor unit.

As shown diagrammatically in FIG. 13, a potentiometric position encoder for use in an aircraft throttle box comprising a linear stepper motor 524 could have five potentiometers 506 each consisting of a resistive track and a conductive track bridged by a wiper 507. The wipers are ganged together to move with the moving element of the linear stepper motor. A reference voltage is applied between the ends of the resistive strip of each potentiometer so that there appears on the corresponding conductive strip an output voltage dependent on the position of the slider and hence on the position of the moving element of the motor.

The reference voltage for each potentiometer is obtained from a duplex supply arrangement comprising two independent reference generators 520 and 521 fed by independent power feeds 522 and 523 of the aircraft. The potentiometers 506 and 507 are fed from the generator 520 while the potentiometers 508 to 510 are fed from generator 521. The output signals DDO from the potentiometers 506 to 509 are led off to an interface/control unit (not shown) which communicate with local engine controllers (not shown). Meanwhile, the output from potentiometer 510 is used as a feedback signal for controlling the motor 524. Accordingly, this signal is digitised by analogue to digital converter 525 and then fed to a control circuit 526 along with a signal APD from the aircraft autopilot (not shown) and representating a level of engine thrust demanded by the autopilot. Using these signals, the control circuit 526 is able to feed trains of drive pulses to the motor 524 via a power output stage 527 of circuit 526 so as to move the throttle lever according to the autopilot demand, each train of pulses preferably including an initial portion in which the pulse repetition rate is ramped up and an end portion where it is ramped down again so that the motor movement comprises a smooth combination of an acceleration phase, a constant-speed phase and a deceleration phase. At the same time, the circuit 526 may receive a signal from a pilot's control device 528 to set the standing energisation level of the motor windings and hence the resistance to manual movement of the throttle lever. Also, the circuit may maintain in store a record of the throttle lever position and, at certain positions, increase the winding energisation so as to provide, electrically, detents at these positions. The circuits may also respond to a predetermined value of signal APD, the value zero for example, indicating that the autopilot is switched off and to then set itself into a manual mode in which it does not output drive pulses to motor 524 but still maintains in store a record of the throttle lever position as the lever is manually moved by the pilot and controls the standing and detent energisation of the windings.

The possibility has been mentioned earlier herein of using, in control apparatus as described, a linear stepper motor in which the electromagnetic drive windings are incorporated in the motor stator rather than the mover. Also, mentioned was the possibility of using some form of wireless transmission, like that shown in FIG. 4 hereof for example, in order to extract control signals from switches mounted on the movable member or lever of the control apparatus. In each case, the object was to avoid the need for cables to extend from the movable member and/or the motor mover to a fixed point of the apparatus. On the other hand, as will be readily apparent, the use of such flexible cables because of its simplicity as compared to say wireless transmission may well be substantially advantageous. In this connection, it will be further noticed that embodiments of the invention described herein where the movable control member has an arcuate movement, as shown in FIGS. 5 and 6 or FIG. 10 or 11 say, are advantageous as compared to the 'linear' embodiments of say FIGS. 7, 8 and 9. The reason for this is that the conductors from the grip mounted control switches and/or from the motor mover can be led down along the movable member and then make the transition across to a fixed part of the apparatus at or near to the point where the movable member is pivotably mounted. At this point, the amount of movement which has to be taken up and hence also the length of the free or 'flying' portion of each conductor, is much less. Thus, as shown in FIG. 6, a winding supply cable 601 from the motor mover 9 can have a short 'free' portion 602 extending between the mover 9 and the member 5, then a portion which is fixed to or extends inside the member 9, and then a further 'free' portion 603 extending from the member 9, reasonably close to the pivot axis 3, over to an exit aperture in the base of housing 2. One or more further cables (not shown) could extend along the member 5 between the exit aperture and control switches (not shown) mounted on or near the grip portion 6.

We claim:

1. A control device for enabling an operator to control associated apparatus to which, in use, the control device is connected, the control device comprising:
    a fixed support member;
    an elongate control lever pivotably connected to the support member for being pivotably moved by an operator with respect to the support member;
    output means connected to the control lever and operable for transmitting to said associated apparatus control signals indicative of the position of the control member relative to the support member;
    a linear electrical stepper motor including a fixed elongate stator supported by the support member and a mover supported by the stator for linear movement therealong, said control lever being pivotably connected to said motor mover at a position on the control lever spaced from the position at which it is pivotably connected to the support member for said pivotable movement of the control lever to be accompanied by said linear movement of the motor mover; and
    motor energization means which is connected to said stepper motor and which is operable for energizing said motor to generate, at least while said control member is at one or more discrete positions in its range of movement relative to the support member, an attractive force between the stator and mover of the motor tending to resist manual movement of the control lever.

2. Control apparatus according to claim 1, wherein said support member takes the form of a housing which encloses said stepper motor and part of said control lever, a further part of said control lever extending from said housing by way of an aperture therein and this further part being provided with a portion adapted for being conveniently engaged by a human operator.

3. Control apparatus according to claim 1, wherein said portion of said control lever comprises a hand-grip portion and wherein there is mounted on said control lever, at least near said hand-grip portion, one or more control switches.

* * * * *